US008121234B2

(12) United States Patent
Lee et al.

(10) Patent No.: US 8,121,234 B2
(45) Date of Patent: Feb. 21, 2012

(54) MULTI-DIMENSIONAL DETECTOR FOR RECEIVER OF MIMO SYSTEM

(75) Inventors: Yu-Ro Lee, Daejon (KR); Jong-Ee Oh, Daejon (KR); Minho Cheong, Daejon (KR); Sok-Kyu Lee, Daejon (KR)

(73) Assignee: Electronics and Telecommunications Research Institute, Deajeon (KR)

( * ) Notice: Subject to any disclaimer, the term of this patent is extended or adjusted under 35 U.S.C. 154(b) by 789 days.

(21) Appl. No.: 12/178,150

(22) Filed: Jul. 23, 2008

(65) Prior Publication Data

US 2009/0154604 A1    Jun. 18, 2009

(30) Foreign Application Priority Data

Dec. 18, 2007   (KR) .................. 10-2007-0133323

(51) Int. Cl.
*H04B 7/10* (2006.01)

(52) U.S. Cl. ........ 375/347; 375/260; 375/262; 375/267; 375/343; 375/346

(58) Field of Classification Search .................. 375/260, 375/267, 340, 346, 347, 343, 349; 455/132, 455/296; 370/203, 204, 205, 208, 209, 210
See application file for complete search history.

(56) References Cited

U.S. PATENT DOCUMENTS 7,746,951 B2 *  6/2010  Hwang et al. ................. 375/267
7,844,003 B2 * 11/2010  Maeda et al. ................. 375/260
2008/0056396 A1 *  3/2008  Li ................................. 375/260
2010/0272220 A1 * 10/2010  Murai et al. .................. 375/346

FOREIGN PATENT DOCUMENTS

| KR | 10-2006-0012825 |   | 2/2006 |
| KR | 10-2007-0079448 |   | 8/2007 |
| KR | 1020070118835 A |   | 12/2007 |
| WO | WO2006/043369 | * | 4/2006 |

OTHER PUBLICATIONS

Kenichi Higuchi et al. "Adaptive Selection of Surviving Symbol Replica Candidates Based on Maximum Reliability in QRM-MLD for OFCDM MIMO Multiplexing", IEEE Communications Society Globecom 2004, Dec. 2004, pp. 2480-2486, vol. 2.

* cited by examiner

*Primary Examiner* — Dhaval Patel
(74) *Attorney, Agent, or Firm* — Kile Park Goekjian Reed & McManus PLLC

(57) ABSTRACT

Provided are a multi-dimensional detector for a receiver of an MIMO system and a method thereof. The multi-dimensional detector includes a first symbol detecting unit for calculating symbol distance values using an upper triangular matrix (R) obtained from QR decomposition to detect an $m^{th}$ symbol; a symbol deciding unit for deciding a symbol having a minimum distance value among the calculated symbol distance values from the first symbol detecting unit; and a second symbol detecting unit for calculating symbol distance values using an updated received signal y and the upper triangular matrix R to detect a $(m-1)^{th}$ symbol.

16 Claims, 10 Drawing Sheets

MULTI-DIMENSIONAL DETECTOR FOR RECEIVER OF MIMO SYSTEM

TECHNICAL FIELD

The present invention relates to a multi-dimensional detector for a receiver of a Multiple Input Multiple Output (MIMO) system, and a method thereof; and, more particularly, to a multi-dimensional detector for a receiver of an MIMO system and a method thereof, which uses multiple dimensions of a received signal when each of symbols is demodulated at a receiver of an orthogonal frequency division multiplexing (OFDM) MIMO system in order to improve performance while reducing hardware complexity.

This work was supported by the IT R&D program of MIC/IITA [2006-S-002-02, "IMT-Advanced Radio Transmission Technology with Low Mobility"].

BACKGROUND ART

Current wireless communication system requires transmission of a high-volume and high-quality multimedia data through limited frequency. As a method for transmitting high-volume data using limited frequency, a Multiple Input and Multiple Output (MIMO) system was introduced. The MIMO system forms a plurality of independent fading channels using multiple antennas at receiving and transmitting ends and transmits different signals through each of multiple transmission antennas, thereby significantly increasing a data transmission rate. Accordingly, the MIMO system can transmit a great deal of data without expansion of a frequency.

However, the MIMO system has a shortcoming that the MIMO system is weak to inter-symbol interference (ISI) and frequency selective fading. In order to overcome the shortcoming, an Orthogonal Frequency Division Multiplexing (OFDM) scheme was used. OFDM scheme is the most proper modulation scheme for transmitting data at a high speed. The OFDM scheme transmits one data sequence through a sub-carrier having a low data transmission rate.

A channel environment for wireless communication has multiple paths due to obstacles such as a building. In a wireless channel environment having multi-paths, delay spread occurs due to the multiple paths. If delay spray time is longer than a symbol transmission interval, inter-symbol interference (ISI) is caused. In this case, frequency selective fading occurs in a frequency domain. In case of using a single carrier, an equalizer is used to remove the ISI. However, complexity of the equalizer increases as a data transmission rate increases.

The shortcomings of the MIMO system can be attenuated using an Orthogonal Frequency Division Multiplexing (OFDM) technology. In order to overcome the shortcomings of the MIMO system while maintaining the advantages of the MIMO system, an OFDM technology was applied to an MIMO system having N transmission antennas and M reception antennas. That is, an MIMO-OFDM system was introduced.

FIGS. 1A and 1B are block diagrams schematically illustrating an MIMO OFDM system. FIG. 1A is a block diagram of a transmitting part in the MIMO-OFDM system, and FIG. 1B is a block diagram of a receiving part in the MIMO-OFDM system.

Referring to FIG. 1A, the transmitting part includes a serial-to-parallel (S/P) converter 101, a plurality of encoders 102, a plurality of Quadrature Amplitude Modulation (QAM) mappers 103, a plurality of inverse fast Fourier transform (IFFT) units 104, a plurality of cyclic prefix (CP) adders 105, and digital-to-analog converter (DAC) and radio frequency (RF) units 106. The S/P converter 101 divides transmission data into a plurality of data sequences before encoding the transmission data. The encoders 102 encode the data sequences, respectively. After encoding, the QAM mappers 103 modulate the encoded data sequences based on a predetermined modulation scheme such as Binary Phase Shift Keying (BPSK), Quadrature Phase Shift Keying (QPSK), 16 QAM, and 64 QAM. The IFFT units 104 transform the modulated symbols into time domain signals, respectively. The CP adders 105 insert a CP code for a guard interval into the time domain signals. Then, the DAC & RF unit 106 converts the CP inserted digital signals to analog signals and convert the analog signals to RF signals. The RF signals are transmitted through an antenna.

Referring to FIG. 1B, the receiving part includes a plurality of analog-to-digital converter (ADC) and radio frequency (RF) units 107, a plurality of CP removers 108, a plurality of Fast Fourier Transform (FFT) units 109, an MIMO receiver, a plurality of decoders 111, and a P/S converter 112. The ADC & RF units 107 convert RF signals to analog signals and convert the analog signals to digital signals. The CP removers 108 remove CP codes which were inserted for a guard interval and transfer the CP code removed signals to the FFT units 109. The FFT units 109 perform FFT on the input parallel signals which are the CP removed signals. The MIMO receiver 110 estimates transmission data symbols which are generated by FFT. The MIMO receiver 110 calculates a log likelihood ratio (LLR) from the estimated symbols. The decoders 111 decode data sequences transferred from the MIMO receiver 110 and estimate the transmission data, respectively. The P/S converters 112 convert parallel data modulated by each decoder 111 into serial data.

The MIMO receiver 110 generally uses a decision feedback equalizer (DFE), zero forcing (ZF), minimum mean square error estimation (MMSE), and bell labs layered space-time (BLAST). As described above, the MIMO receiver has a problem of low performance although the MIMO receiver has a comparative simple structure compared to maximum likelihood detection (MLD).

DISCLOSURE

Technical Problem

An embodiment of the present invention is directed to providing a multi-dimensional detector for a receiver of a multiple input multiple output (MIMO) system and a method thereof, which uses multiple dimensions of a received signal when each of symbols is demodulated at a receiver of an Orthogonal Frequency Division Multiplexing (OFDM) MIMO system in order to improve performance while reducing hardware complexity.

Other objects and advantages of the present invention can be understood by the following description, and become apparent with references to the embodiments of the present invention. Also, it is obvious to those skilled in the art of the present invention that the objects and advantages of the present invention can be realized by the unit as claimed and combinations thereof.

Technical Solution

In accordance with an aspect of the present invention, there is provided a multi-dimensional detector for a receiver of a Multiple Input Multiple Output (MIMO) system, including: a first symbol detecting unit for calculating symbol distance values using an upper triangular matrix (R) obtained from QR decomposition to detect an $m^{th}$ symbol; a symbol deciding unit for deciding a symbol having a minimum distance value among the calculated symbol distance values from the first symbol detecting unit; and a second symbol detecting unit for calculating symbol distance values using an updated received signal y and the upper triangular matrix R to detect a $(m-1)^{th}$ symbol.

The multi-dimensional detector may further include a column removing and y updating unit for removing an $m^{th}$ column of an upper triangular matrix R from the decided $m^{th}$ symbol, and updating the received signal y, and providing the column removed upper triangular matrix R and the updated received signal y to the second symbol detecting unit.

The multi-dimensional detector may further include: a first log likelihood ratio calculating unit for calculating a first log likelihood ratio using the symbol distance values outputted from the first symbol detecting unit; and a second log likelihood ratio calculating unit for calculating a second log likelihood ratio using the symbol distance values outputted from the second symbol detecting unit.

In accordance with another aspect of the present invention, there is provide a multiple detecting method for a receiver of a multiple input multiple output. (MIMO) system, including: calculating symbol distance values using an upper triangular matrix R obtained from QR decomposition to detect an $m^{th}$ symbol; deciding a symbol having a minimum distance value among the calculated symbol distance values; and calculating symbol distance values using an updated received signal y and the upper triangular matrix R to detect a $(m-1)^{th}$ symbol.

In accordance with still another embodiment of the present invention, there is provided a receiver of a Multiple Input Multiple Output (MIMO) system, including: a QR decomposing unit for decomposing a received signal to an unitary matrix Q and an upper triangular matrix R; and a multi-dimensional detecting unit for deciding an $m^{th}$ symbol and a $(m-1)^{th}$ symbol through multi-dimensional detection for the output of the QR decomposing unit, wherein the multi-dimensional detecting unit includes: a first symbol detecting unit for calculating symbol distance values using an upper triangular matrix (R) obtained from QR decomposition to detect an $m^{th}$ symbol; a symbol deciding unit for deciding a symbol having a minimum distance value among the calculated symbol distance values from the first symbol detecting unit; and a second symbol detecting unit for calculating symbol distance values using an updated received signal y and the upper triangular matrix R to detect a $(m-1)^{th}$ symbol.

Advantageous Effects

A multi-dimensional detector for a receiver of an MIMO system and a method thereof according to the present invention uses multiple dimensions of a received signal when each of symbols is demodulated at a receiver of an OFDM MIMO system. Therefore, performance can be improved while reducing hardware complexity.

BEST MODE FOR THE INVENTION

The advantages, features and aspects of the invention will become apparent from the following description of the embodiments with reference to the accompanying drawings, which is set forth hereinafter.

Figure 2:
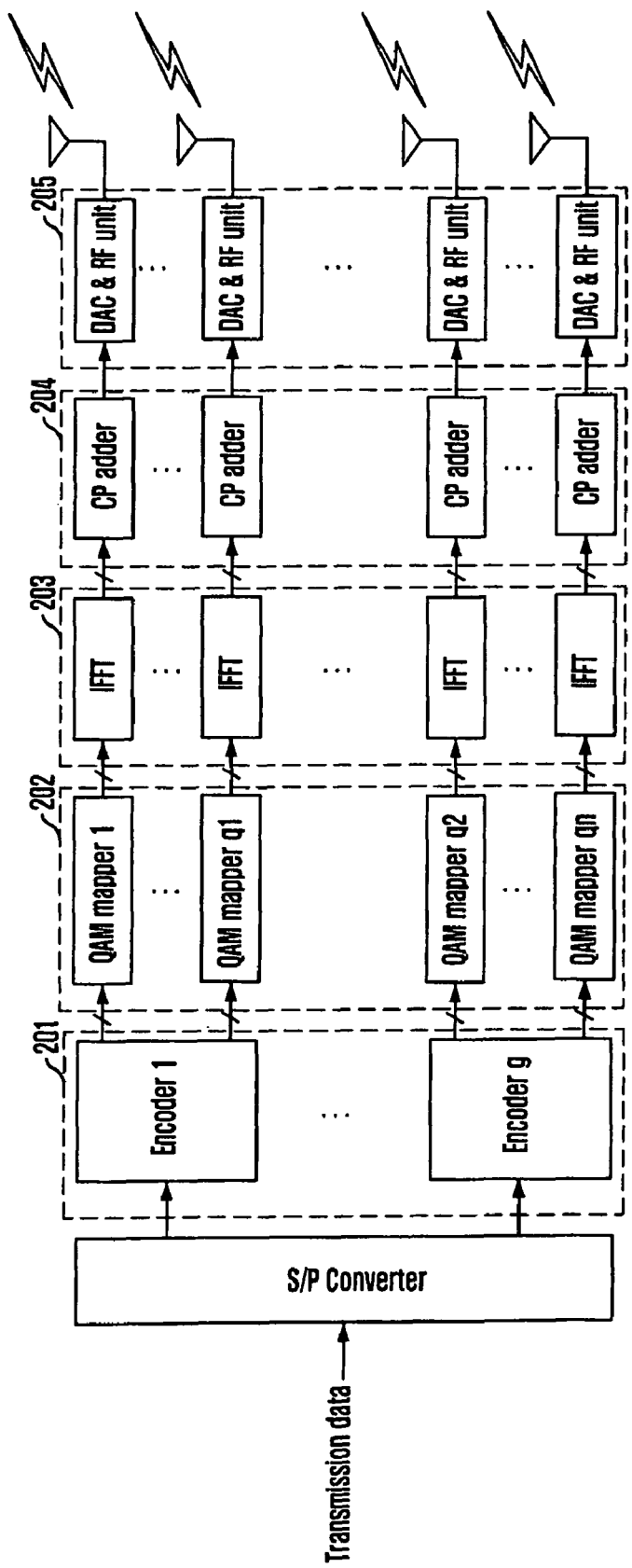
FIG. 2 is a block diagram illustrating a transmitter of an OFDM MIMO system to which the present invention is applied.

FIG. 2 is a block diagram illustrating a transmitter of an MIMO-OFDM system to which the present invention is applied.

Referring to FIG. 2, the transmitter includes a serial to parallel converter, a plurality of encoders 201, a plurality of Inverse Fast Fourier Transform (IFFT) units 203, a plurality of cyclic prefix (CP) adders 204, and a plurality of digital-to-analog converter (DAC) & radio frequency (RF) units 205. The transmitter receives data from a transmission antenna. The S/P converter converts the received data to parallel data sequences and outputs the parallel data sequences to the g encoders 201 where g is an integer number. Each of the g encoders 201 is connected to q QAM mappers 202, respectively. Each of the QAM mappers 202 may have a different channel coding rate and modulation scheme.

Figure 1A:
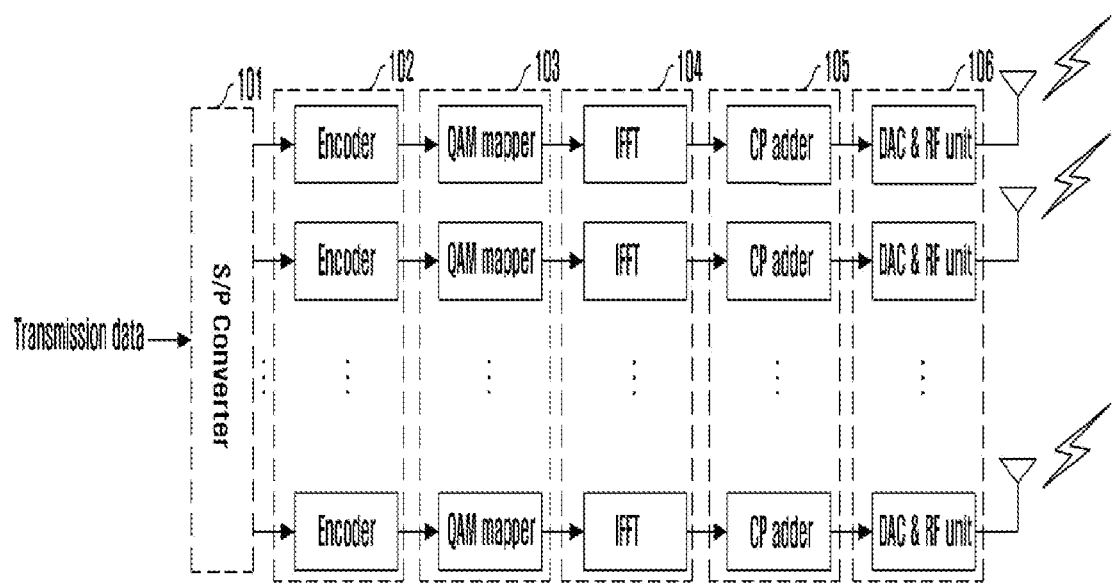
FIGS. 1A and 1B are schematic block diagrams illustrating an Orthogonal Frequency Division Multiplexing (OFDM) Multiple Input Multiple Output (MIMO) system.
Figure 1B:
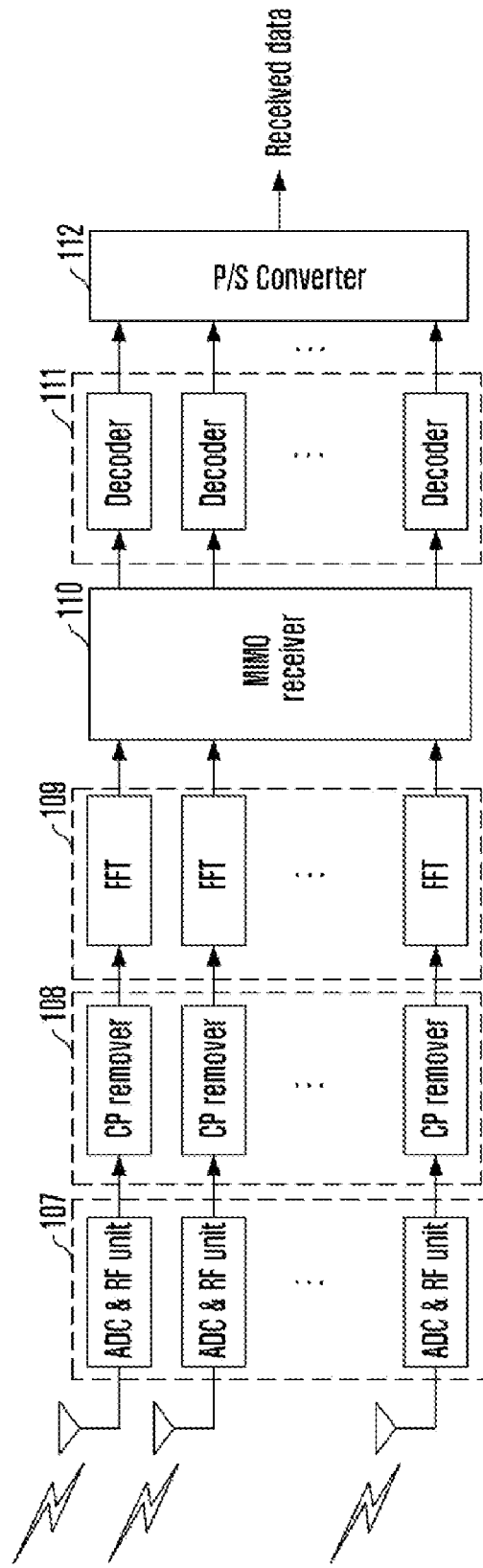

The QAM mappers 202 are sequentially connected to the IFFT units 203, the CP adders 204, and the DAC & RF units 205, respectively. Since the operations of the QAM mappers 202, the IFFT units 203, the CP adders 204, and the DAC and RF units 205 are identical to the constituent elements shown in FIG. 1A, the detailed descriptions: on them will be omitted herein.

Figure 3:
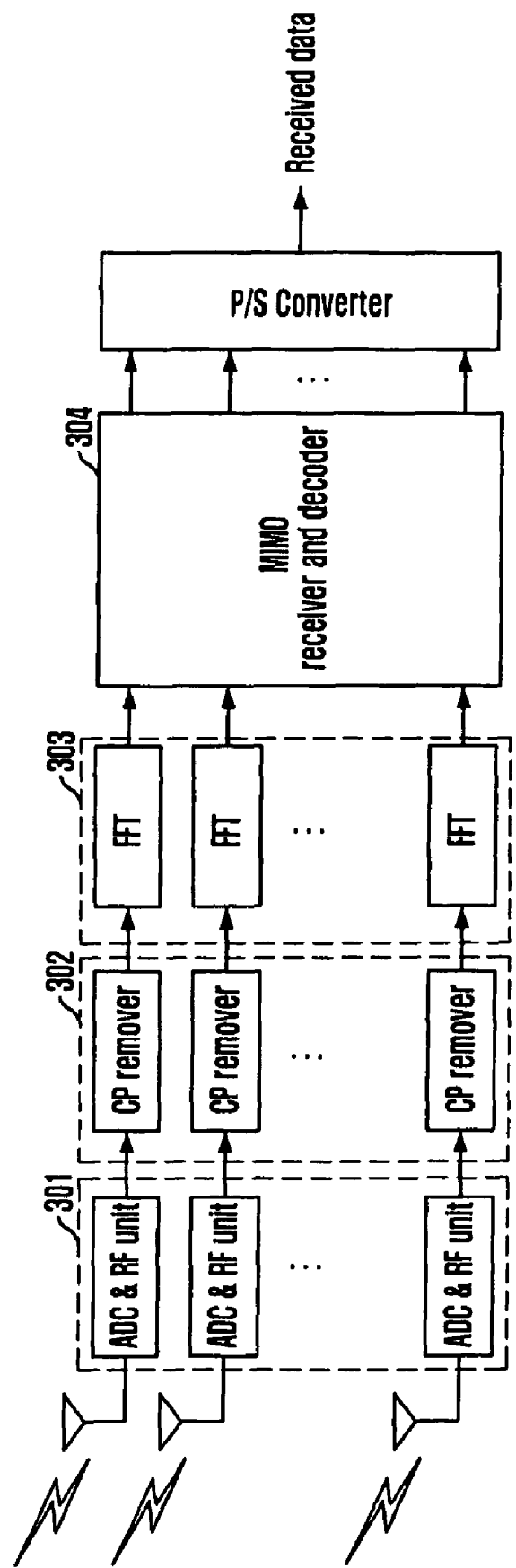
FIG. 3 is a block diagram illustrating a receiver of an OFDM MIMO system to which the present invention is applied.

FIG. 3 is a block diagram illustrating a receiver of an OFDM MIMO system where the present invention applied to.

Referring to FIG. 3, the receiver includes a plurality of analog digital converter (ADC) & radio frequency (RF) units 301, a plurality of cyclic prefix (CP) removers 302, a plurality of Fast Fourier Transform (FFT) units 303, an MIMO receiver and decoder 304, and a parallel-to-serial (P/S) converter. The ADC & RF units 301 convert a radio frequency (RF) signal to an analog signal and convert the analog signal to a digital signal. The CP removers 302 remove a cyclic prefix (CP) code which is inserted for a guard interval. The FFT units 303 perform FFT on the CP removed parallel signal.

The MIMO receiver and decoder 304 are a multi-dimensional receiver and decoder that demodulate the received symbols from the FFT units 303.

If it is assumed that the receiver includes M transmission antennas and N receipt antennas, a received signal vector z can be expressed as Eq. 1 in a sub carrier after FFT.

$$z = Hs + n \qquad \text{Eq. 1}$$

In Eq. 1, the received signal vector Z can be expressed as $$z = \begin{bmatrix} z_1 \\ z_2 \\ \vdots \\ z_N \end{bmatrix},$$

a channel H can be expressed as $$H = \begin{bmatrix} h_{1,1} & h_{1,2} & \cdots & h_{1,M} \\ h_{2,1} & h_{2,2} & \cdots & h_{2,M} \\ \vdots & \vdots & \ddots & \vdots \\ h_{N,1} & h_{N,2} & \cdots & h_{N,M} \end{bmatrix},$$

and a transmission symbol s can be expressed as $$S = \begin{bmatrix} s_1 \\ s_2 \\ \vdots \\ s_M \end{bmatrix}.$$

The channel H can be expressed as H=QR after QR decomposition. Here, R denotes an upper triangular matrix. Since the MIMO system includes N antennas for receiving a signal and M antennas for transmitting a signal, the upper triangular matrix R can be expressed as follow.

$$R = Q^H H = \begin{bmatrix} r_{1,1} & r_{1,2} & \cdots & r_{1,M} \\ 0 & r_{2,2} & \cdots & r_{2,M} \\ \vdots & \vdots & \ddots & \vdots \\ 0 & 0 & \cdots & r_{M,M} \\ 0 & 0 & \cdots & 0 \\ \vdots & \vdots & \ddots & \vdots \\ 0 & 0 & \cdots & 0_{N,M} \end{bmatrix}$$

Q denotes a Unitary matrix ($Q^H Q=I$). Since the channel matrix H is N×M, the unitary matrix Q is N×N and the upper triangular matrix R is N×M. The unitary matrix Q can be expressed as follow.

$$Q = \begin{bmatrix} q_{1,1} & q_{1,2} & q_{1,3} & q_{1,4} & \cdots & q_{1,N} \\ q_{2,1} & q_{2,2} & q_{2,3} & q_{2,4} & \cdots & q_{2,N} \\ q_{3,1} & q_{3,2} & q_{3,3} & q_{3,4} & \cdots & q_{3,N} \\ q_{4,1} & q_{4,2} & q_{4,3} & q_{4,4} & \cdots & q_{4,N} \\ \vdots & \vdots & \vdots & \vdots & \ddots & \vdots \\ q_{N,1} & q_{N,2} & q_{N,3} & q_{N,4} & \cdots & q_{N,N} \end{bmatrix}.$$

After QR decomposition, a received signal can be expressed as Eq. 2.

$$y = \begin{bmatrix} y_1 \\ y_2 \\ \vdots \\ y_N \end{bmatrix} Q^H z = Rs + n' = \begin{bmatrix} r_{1,1} & r_{1,2} & \cdots & r_{1,M} \\ 0 & r_{22} & \cdots & r_{2,M} \\ 0 & \vdots & \ddots & \vdots \\ 0 & \cdots & 0 & r_{N,M} \end{bmatrix} \begin{bmatrix} s_1 \\ s_2 \\ \vdots \\ s_M \end{bmatrix} + \begin{bmatrix} n'_1 \\ n'_2 \\ \vdots \\ n'_N \end{bmatrix} \quad \text{Eq. 2}$$

Eq. 2 can be simplified as follow.

$$y = \begin{bmatrix} y_1 \\ y_2 \\ \vdots \\ y_N \end{bmatrix} Q^H z = Rs + n' = \begin{bmatrix} r_{1,1} & r_{1,2} & \cdots & r_{1,M} \\ 0 & r_{22} & \cdots & r_{2,M} \\ 0 & \vdots & \ddots & \vdots \\ 0 & \cdots & 0 & r_{M,M} \end{bmatrix} \begin{bmatrix} s_1 \\ s_2 \\ \vdots \\ s_M \end{bmatrix} + \begin{bmatrix} n'_1 \\ n'_2 \\ \vdots \\ n'_M \end{bmatrix}$$

The MIMO receiver according to the present embodiment includes a QR decomposition unit, a multi-dimensional detector (MDD), an inverse matrix and weight calculator, an interference remover, and a weight zero forcing (WZF) unit.

The QR decomposition unit calculates the unitary matrix Q, the upper triangular matrix R, and a vector size (norm) from the received signal vector z during a long training field (LTF) period. The QR decomposition unit stores the calculated unitary matrix Q and the upper triangular matrix R, vector sizes (norm) for each element of the unitary matrix Q. Here, the $\text{norm}_i$ is equivalent to $\|q_i\|^2$.

A signal field detector performs detection for a signal field from an output vector of the QR decomposing unit in a SIG interval. The inverse matrix and weight calculator calculates an inverse matrix of the upper triangular matrix R during first two symbol intervals among symbols for receiving data symbols using the calculated upper triangular matrix R and the vector size ($1/\sqrt{\text{norm}}$. The multi-dimensional detector MDD calculates a log likelihood ratio (LLR) through multiple detections using the output vector y and the upper triangular matrix value of the QR decomposition. The calculated LLR value is inputted to a channel decoder, and used to demodulate the signal.

The interference remover receives the data stream demodulated by the channel decoder, generates symbols corresponding to a data stream demodulated through symbol mapping, and removes interference from the output vector, which is the QR decomposition result, using the generated symbol. The WZF unit performs zero-forcing using the interference removed output vector and the inverse matrix of the upper triangular matrix R. The channel decoder receives the LLR value outputted from the WZF unit and uses the LLR value to demodulate signals.

Figure 4:
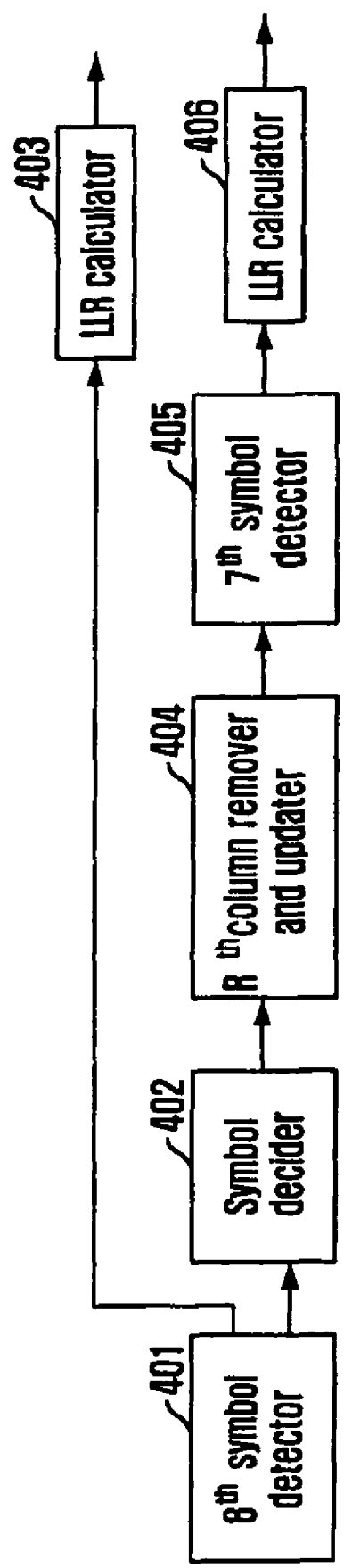
FIG. 4 is a block diagram illustrating a multi-dimensional detector in accordance with an embodiment of the present invention.

FIG. 4 is a block diagram illustrating a multi-dimensional detector for deciding $7^{th}$ and $8^{th}$ symbols in accordance with an embodiment of the present invention.

Referring to FIG. 4, The multi-dimensional detector according to the present embodiment includes an $8^{th}$ symbol detector, a symbol decider 402, an LLR calculator 403, a column remover and updater 404, a $7^{th}$ symbol detector 405, and an LLR calculator 406. The $8^{th}$ symbol detector 401 calculates distances for a symbol in order to detect the $8^{th}$ symbol using an upper triangular matrix R value of an R memory and the upper triangular matrix value R of the QR decomposition unit symbols which is inputted when an mdd_ene enable signal is in an On state. The described above operation of the $8^{th}$ symbol detector 401 will be described in detail with reference to FIG. 5. The LLR calculator 403 calculates a log likelihood ratio (LLR) value using the calculated symbol distances for detecting the $8^{th}$ symbol.

The symbol decider 402 decides an $8^{th}$ symbol having a minimum distance among the calculated symbol distances calculated by the $8^{th}$ symbol detector 401. The column remover and updating unit 404 removes an $8^{th}$ column of the upper triangular matrix R from the determined $8^{th}$ symbol from the symbol determiner 402 and updates a signal y.

The $7^{th}$ symbol detector 405 calculates symbol distances for detecting a $7^{th}$ symbol using the updated signal y through the same operations performed for detecting the $8^{th}$ symbol. The LLR calculator 406 calculates a log likelihood ratio (LLR) using the calculated distances by the $7^{th}$ symbol detector 405.

Figure 5:
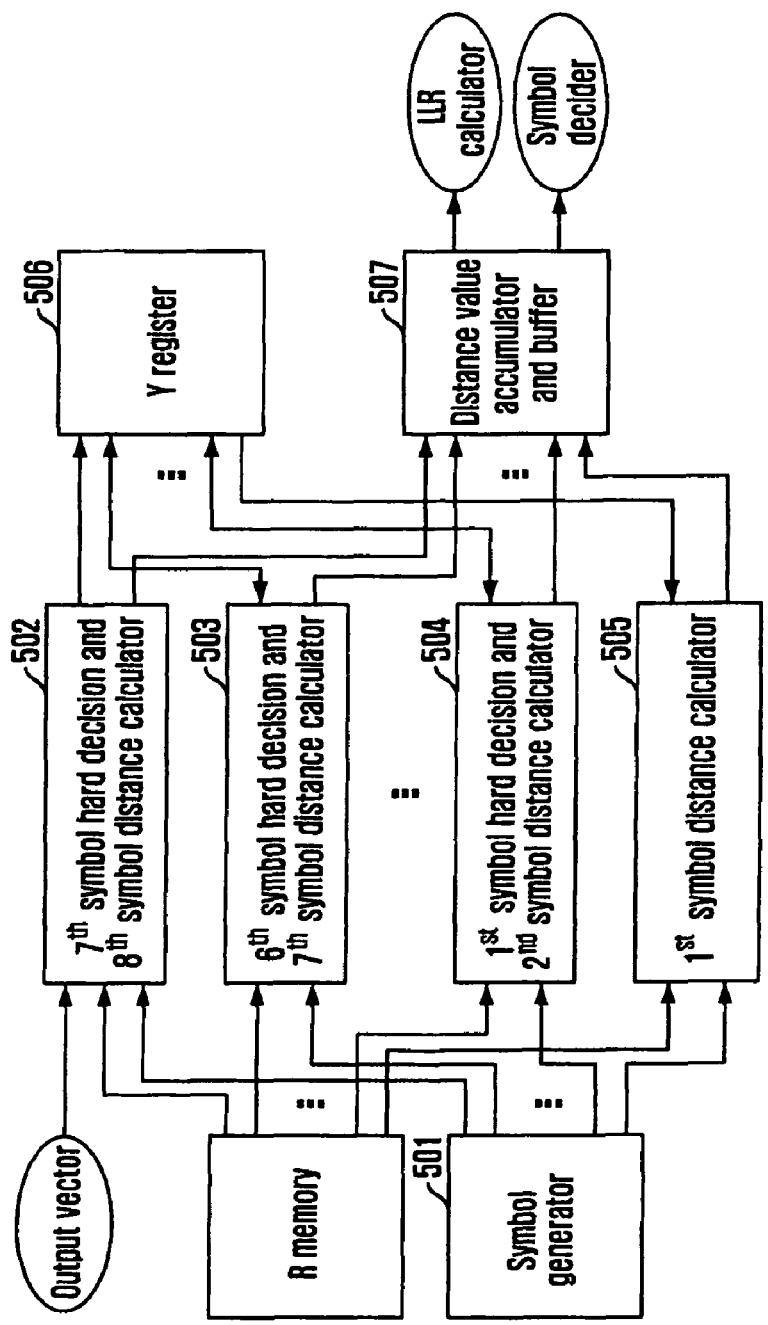
FIG. 5 is a block diagram illustrating an $8^{th}$ symbol detector in accordance with an embodiment of the present invention.

FIG. 5 is a block diagram illustrating an $8^{th}$ symbol detector 401 in accordance with an embodiment of the present invention.

Referring to FIG. 5, the $8^{th}$ symbol detector 401 includes a symbol generator, a $7^{th}$ symbol hard decision and $8^{th}$ symbol distance calculator 502, a $6^{th}$ symbol hard decision and $7^{th}$ symbol distance calculator 503, a $1^{st}$ symbol hard decision and $2^{nd}$ symbol distance calculator 504, a $1^{st}$ symbol distance calculator 505, a Y register 506, a distance accumulator and buffer 507. The symbol generator 501 generates symbols having lattice points. For example, the symbol generator 501 generates a symbol having 16 lattice points in case of 16 QAM. Therefore, there are 16 distances for a symbol.

The $7^{th}$ symbol hard decision and $8^{th}$ symbol distance calculator 502 performs hard decision for a $7^{th}$ symbol for symbols generated from the symbol generator 501 and calculates distance values of a $8^{th}$ symbol in order to detect a $8^{th}$ symbol using an output vector of QR decomposition and an upper triangular matrix R value of a R memory when an enable signal mdd_ene is in an on state. Then, the $7^{th}$ symbol hard decision and $8^{th}$ symbol distance calculator 502 stores the updated signal y to the y register 506 while removing the $8^{th}$ column of the upper triangular matrix R.

The $6^{th}$ symbol hard decision and $7^{th}$ symbol distance calculator 503 performs hard decision for a $6^{th}$ symbol generated from the symbol generator 501 and calculates distance values of the $7^{th}$ symbol using the updated y value of the y register 506 and the upper triangular matrix R value of the R memory in order to detect the $8^{th}$ symbol. The distance value accumulator and buffer 507 accumulates the distance values of the $8^{th}$ symbol and the distance values of the $7^{th}$ symbol and stores the accumulated distance values in a register.

The $5^{th}$ symbol hard decision and $6^{th}$ symbol distance calculator performs hard decision for a $5^{th}$ symbol generated by the symbol generator 501 using the updated y value of the y register 506 in order to detect the $8^{th}$ symbol and the upper triangular matrix R value in the R memory and calculates distance values of a $6^{th}$ symbol.

Then, distances for a $5^{th}$ symbol, distances for a $4^{th}$ symbol, distances for a $3^{rd}$ symbol, distances 504 for a $2^{nd}$ symbol, and distances 505 for a $1^{st}$ symbol are sequentially calculated through the same operations as described above.

The distance value accumulator and buffer 507 accumulates distance values of each symbol for detecting the calculated $8^{th}$ symbol and stores the accumulated distance value in a register. The values, stored in the distance value accumulator and buffer 507, are transferred to the LLR calculator and the symbol decider.

A $7^{th}$ symbol detector for detecting a $7^{th}$ symbol has the similar structure of the $8^{th}$ symbol detector shown in FIG. 5. However, the $7^{th}$ symbol detector receives a signal y with a $8^{th}$ column of an upper triangular matrix R removed and calculates distance values for detecting a $7^{th}$ symbol.

The operations for deciding the $8^{th}$ symbol and the $7^{th}$ symbol will be described as cycle.

In $\tilde{y}_{1,8,8,x}$, a $1^{st}$ subscript denotes cycle, a $2^{nd}$ subscript denotes a symbol number to estimate, and a $3^{rd}$ subscript denotes a number of a signal y vector, and x denotes the number of symbols generated from the symbol generator.

For example, the x may be smaller than 4 for QPSK, the x may be smaller than 16 for 16 QAM, and smaller than 64 for 64 QAM. In $E_{8,8,x}$, a $1^{st}$ subscript denotes a symbol number to estimate, a $2^{nd}$ subscript denotes the number of vector elements for calculating a distance, and a $3^{rd}$ subscript denotes the number of symbols generated from the symbol generator. In $\tilde{S}_{8,7,x}$, a $1^{st}$ subscript denotes the number of symbols generated from the symbol generator, a $2^{nd}$ subscript denotes the number of vector elements for hard decision, and a $3^{rd}$ subscript denotes the number of symbols generated from the symbol generator. In one cycle, C denotes constant of Eq. 3.

$$y_i = C * y_i, \quad \text{Eq. 3}$$

$$\text{where } C = \begin{cases} Q4\_POW2 = \dfrac{0.5}{1/\sqrt{2}}, & \text{for } QPSK \\ Q16\_POW2 = \dfrac{0.5}{2/\sqrt{10}}, & \text{for } 16QAM \\ Q64\_POW2 = \dfrac{0.5}{4/\sqrt{42}}, & \text{for } 64QAM \end{cases}$$

$$s_i = \begin{cases} \left(-\dfrac{1}{2}, \dfrac{1}{2}\right) + j\left(-\dfrac{1}{2}, \dfrac{1}{2}\right), & \text{for } QPSK \\ \left(-\dfrac{3}{4}, -\dfrac{1}{4}, \dfrac{1}{4}, -\dfrac{3}{4}\right) + j\left(-\dfrac{3}{4}, -\dfrac{1}{4}, \dfrac{1}{4}, \dfrac{3}{4}\right), & \text{for } 16QAM \\ \left(-\dfrac{7}{8}, -\dfrac{5}{8}, -\dfrac{3}{8}, -\dfrac{1}{8}, \dfrac{7}{8}, \dfrac{5}{8}, \dfrac{3}{8}, \dfrac{1}{8}\right) + j\left(-\dfrac{7}{8}, -\dfrac{5}{8}, -\dfrac{3}{8}, -\dfrac{1}{8}, \dfrac{7}{8}, \dfrac{5}{8}, \dfrac{3}{8}, \dfrac{1}{8}\right), & \text{for } 64QAM \end{cases}$$

$$y_i = y_i - r_{k,i} * s_i$$

$$= y_i - r_{k,i} * \begin{cases} \left(-\dfrac{1}{2}, \dfrac{1}{2}\right) + j\left(-\dfrac{1}{2}, \dfrac{1}{2}\right), & \text{for } QPSK \\ \left(-\dfrac{3}{4}, -\dfrac{1}{4}, \dfrac{1}{4}, -\dfrac{3}{4}\right) + j\left(-\dfrac{3}{4}, -\dfrac{1}{4}, \dfrac{1}{4}, \dfrac{3}{4}\right), & \text{for } 16QAM \\ \left(\begin{array}{c} -\dfrac{7}{8}, -\dfrac{5}{8}, -\dfrac{3}{8}, \\ -\dfrac{1}{8}, \dfrac{7}{8}, \dfrac{5}{8}, \dfrac{3}{8}, \dfrac{1}{8} \end{array}\right) + j\left(\begin{array}{c} -\dfrac{7}{8}, -\dfrac{5}{8}, -\dfrac{3}{8}, \\ -\dfrac{1}{8}, \dfrac{7}{8}, \dfrac{5}{8}, \dfrac{3}{8}, \dfrac{1}{8} \end{array}\right); & \text{for } 64QAM \end{cases}$$

At first, a first cycle for detecting an $8^{th}$ symbol is expressed as Eq. 4.

$$\tilde{y}_{1,8,8,x}=Cy_8-r_{8,8}s_{8,x}$$
$$\tilde{y}_{1,8,7,x}=Cy_7-r_{7,8}s_{8,x}$$
$$\ldots$$
$$\tilde{y}_{1,8,1,x}=Cy_1-r_{1,8}s_{8,x}$$
$$E_{8,x}=|\tilde{y}_{1,8,8,x}|^2$$
$$\tilde{s}_{8,7,x}=\text{hard decision}(\tilde{y}_{1,8,7,x}/r_{7,7}) \qquad \text{Eq. 4}$$

A $2^{nd}$ cycle for detecting an $8^{th}$ symbol can be expressed as Eq. 5.

$$\tilde{y}_{2,8,7,x}=\tilde{y}_{1,8,7,x}-r_{7,7}\tilde{s}_{8,7,x}$$
$$\tilde{y}_{2,8,6,x}=\tilde{y}_{1,8,6,x}-r_{6,7}\tilde{s}_{8,7,x}$$
$$\ldots$$
$$\tilde{y}_{2,8,1,x}=\tilde{y}_{1,8,1,x}-r_{1,7}\tilde{s}_{8,7,x}$$
$$E_{8,7,x}=E_{8,8,x}+|\tilde{y}_{2,8,7,x}|^2$$
$$\tilde{s}_{8,6,x}=\text{hard decision}(\tilde{y}_{2,8,6,x}/r_{6,6}) \qquad \text{Eq. 5}$$

Then, a $3^{rd}$ cycle for detecting an $8^{th}$ symbol can be expressed as Eq. 6.

$$\tilde{y}_{3,8,6,x}=\tilde{y}_{2,8,6,x}-r_{6,6}\tilde{s}_{8,6,x}$$
$$\tilde{y}_{3,8,5,x}=\tilde{y}_{2,8,5,x}-r_{5,6}\tilde{s}_{8,6,x}$$
$$\ldots$$
$$\tilde{y}_{3,8,1,x}=\tilde{y}_{2,8,1,x}-r_{1,6}\tilde{s}_{8,6,x}$$
$$E_{8,6,x}=E_{8,7,x}+|\tilde{y}_{3,8,6,x}|^2$$
$$\tilde{s}_{8,5,x}=\text{hard decision}(\tilde{y}_{3,8,5,x}/r_{5,5}) \qquad \text{Eq. 6}$$

The same operations are repeated from a $4^{th}$ cycle to a $7^{th}$ cycle. Then, an $8^{th}$ cycle is expressed as Eq. 7.

$$\tilde{y}_{8,8,1,x}=\tilde{y}_{7,8,1,x}-r_{1,1}\tilde{s}_{8,1,x}$$
$$E_{8,1,x}=E_{8,2,x}+|\tilde{y}_{8,8,1,x}|^2 \qquad \text{Eq. 7}$$

After calculating distance values of each vector element for detecting the $8^{th}$ symbol through the 8 cycles, a symbol having the minimum value among the calculated distance values is detected as the $8^{th}$ symbol in the $9^{th}$ cycle like Eq. 8.

$$\min(D_{8,1,x})=>\tilde{s}_8 \qquad \text{Eq. 8}$$

The LLR of the $8^{th}$ symbol is calculated like Eq. 9 in $p=(b_0b_1b_2b_3)$ using the calculated distance values at the $9^{th}$ cycle. In Eq. 9, k denotes a symbol number. For example, k is as 8 in case of a 16 QAM modulation scheme.

$$\rho_k^0=\min(E_{k,1,0},E_{k,1,1},E_{k,1,2},E_{k,1,3},E_{k,1,4},E_{k,1,5},E_{k,1,6},$$
$$E_{k,1,7})-\min(E_{k,1,8},E_{k,1,9},E_{k,1,10},E_{k,1,11},E_{k,1,12},$$
$$E_{k,1,13},E_{k,1,14},E_{k,1,15})$$

$$\rho_k^1=\min(E_{k,1,0},E_{k,1,1},E_{k,1,2},E_{k,1,3},E_{k,1,8},E_{k,1,9},E_{k,1,10},$$
$$E_{k,1,11})-\min(E_{k,1,4},E_{k,1,5},E_{k,1,6},E_{k,1,7},E_{k,1,12},$$
$$E_{k,1,13},E_{k,1,13},E_{k,1,14},E_{1,1,15})$$

$$\rho_k^2=\min(E_{k,1,0},E_{k,1,4},E_{k,1,8},E_{k,1,12},E_{k,1,1},E_{k,1,5},E_{k,1,9},$$
$$E_{k,1,13})-\min(E_{k,1,2},E_{k,1,6},E_{k,1,10},E_{k,1,14},E_{k,1,3},$$
$$E_{k,1,7},E_{k,1,11},E_{k,1,15})$$

$$\rho_k^3=\min(E_{k,1,0},E_{k,1,4},E_{k,1,8},E_{k,1,12},E_{k,1,2},E_{k,1,6},E_{k,1,10},$$
$$E_{k,1,14})-\min(E_{k,1,1},E_{k,1,5},E_{k,1,9},E_{k,1,13},E_{k,1,3},$$
$$E_{k,1,7},E_{k,1,11},E_{k,1,15}) \qquad \text{Eq. 9}$$

Then, a $10^{th}$ cycle for detecting a $7^{th}$ symbol is expressed as Eq. 10.

$$\tilde{y}_{10,7,7,x}=y_7-r_{7,8}\tilde{s}_{8,x}$$
$$\tilde{y}_{10,7,6,x}=y_6-r_{6,8}\tilde{s}_{8,x}$$
$$\ldots$$
$$\tilde{y}_{10,7,1,x}=y_1-r_{1,8}\tilde{s}_{8,x}$$
$$E_{7,7,x}=|\tilde{y}_{10,7,7,x}|^2$$
$$\tilde{s}_{7,6,x}=\text{hard decision}(\tilde{y}_{10,7,6,x}/r_{6,6}) \qquad \text{Eq. 10}$$

Then, an $11^{th}$ cycle for detecting a $7^{th}$ symbol is expressed as Eq. 11.

$$\tilde{y}_{11,7,6,x}=\tilde{y}_{10,7,6,x}-r_{6,6}\tilde{s}_{7,6,x}$$
$$\tilde{y}_{11,7,5,x}=\tilde{y}_{10,7,5,x}-r_{5,6}\tilde{s}_{7,6,x}$$
$$\ldots$$
$$\tilde{y}_{11,7,1,x}=\tilde{y}_{10,7,1,x}-r_{1,6}\tilde{s}_{7,6,x}$$
$$E_{7,6,x}=E_{7,7,x}+|\tilde{y}_{11,7,6,x}|^2$$
$$\tilde{s}_{7,5,x}=\text{hard decision}(\tilde{y}_{11,7,5,x}/r_{5,5}) \qquad \text{Eq. 11}$$

The same operations are repeated from a $12^{th}$ cycle to a $15^{th}$ cycle. A $16^{th}$ cycle is expressed like Eq. 12.

$$\tilde{y}_{16,7,1,x}=\tilde{y}_{15,7,1,x}-r_{1,1}\tilde{s}_{7,1,x}$$
$$E_{7,1,x}=E_{7,2,x}+|\tilde{y}_{16,7,1,x}|^2 \qquad \text{Eq. 12}$$

In a next $17^{th}$ cycle, an LLR for the $7^{th}$ symbol is calculated like Eq. 13. In Eq. 13, k denotes a symbol number and k is 7 for 16 QAM.

$$\rho_k^0=\min(E_{k,1,0},E_{k,1,1},E_{k,1,2},E_{k,1,3},E_{k,1,4},E_{k,1,5},E_{k,1,6},$$
$$E_{k,1,7})-\min(E_{k,1,8},E_{k,1,9},E_{k,1,10},E_{k,1,11},E_{k,1,12},$$
$$E_{k,1,13},E_{k,1,14},E_{k,1,15})$$

$$\rho_k^1=\min(E_{k,1,0},E_{k,1,1},E_{k,1,2},E_{k,1,3},E_{k,1,8},E_{k,1,9},E_{k,1,10},$$
$$E_{k,1,11})-\min(E_{k,1,4},E_{k,1,5},E_{k,1,6},E_{k,1,7},E_{k,1,12},$$
$$E_{k,1,13},E_{k,1,14},E_{k,1,15})$$

$$\rho_k^2=\min(E_{k,1,0},E_{k,1,4},E_{k,1,8},E_{k,1,12},E_{k,1,1},E_{k,1,5},E_{k,1,9},$$
$$E_{k,1,13})-\min(E_{k,1,2},E_{k,1,6},E_{k,1,10},E_{k,1,14},E_{k,1,3},$$
$$E_{k,1,7},E_{k,1,11},E_{k,1,15})$$

$$\rho_k^3=\min(E_{k,1,0},E_{k,1,4},E_{k,1,8},E_{k,1,12},E_{k,1,2},E_{k,1,6},E_{k,1,10},$$
$$E_{k,1,14})-\min(E_{k,1,1},E_{k,1,5},E_{k,1,9},E_{k,1,13},E_{k,1,3},E_{k,1,7},$$
$$E_{k,1,11},E_{k,1,15}) \qquad \text{Eq. 13}$$

In the symbol hard decision and symbol distance calculation, a multiplier is needed for multiplying symbols generated from the symbol generator with elements of the upper triangular matrix R. If the multiplier is used, computation complexity and hardware complexity will increase.

If one of constants introduced in Eq. 3 is multiplied with a received signal according to a modulation scheme, the symbol generator outputs symbols as shown in Eq. 3. In order to overcome the increment of hardware and computation complexity, shifters and adders are used in the present embodiment instead of using the multiplier for multiplying the symbols generated by the symbol generator with the elements of the upper triangular matrix R.

If the shifters and the adders are used, hardware complexity may be significantly reduced. For example, according to the present invention, ⅝ is equivalent to ½+⅛, and r*(⅝) is equivalent to a sum of a result of shifting r once to right and a result of shifting r three times to right.

Figure 6:
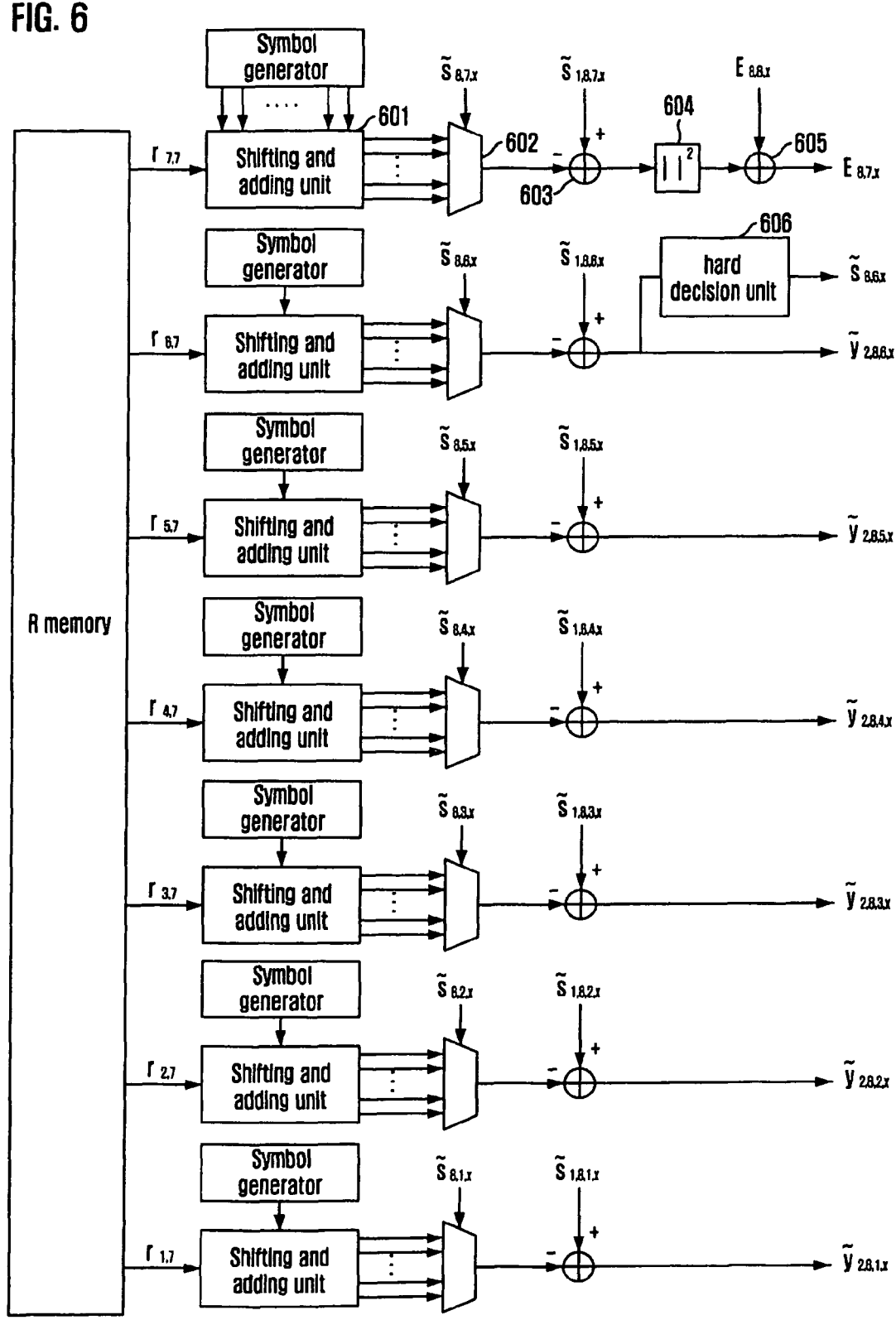
FIG. 6 is a block diagram illustrating a symbol hard decision unit and a symbol distance calculator in accordance with an embodiment of the present invention.

FIG. 6 is a diagram illustrating a symbol hard decision unit and a symbol distance value: calculator using shifters and adders in accordance with an embodiment of the present invention.

That is, FIG. 6 shows a structure of a $6^{th}$ symbol hard decision and $7^{th}$ symbol distance calculator for detecting an $8^{th}$ symbol in accordance with an embodiment of the present invention.

Referring to FIG. 6, the symbol generator generates a real symbol and an imaginary symbol according to a modulation scheme such as QPSK, 16 QAM, and 64 QAM. The symbols generated by the symbol generator are used to update a vector of a received signal y by shifting and adding output values of an R memory.

The $6^{th}$ symbol hard decision and $7^{th}$ symbol distance calculator according to the present embodiment includes a shifting and adding unit 601, a multiplexer 602, an adder 603, a squaring unit 604, and a subtractor 605. The shifting and adding unit 601 shifts an inputted upper triangular matrix R as many as symbols generated by the symbol generator and adds them. One of the outputs of the shifting and adding unit 601 is selected by the multiplexer 602 according to the hard decision result of a $7^{th}$ symbol of a previous cycle.

The subtractor 603 subtracts the selected output from the multiplexer 602 from the received signal y updated at a previous cycle, thereby outputting a newly updated received signal y. The outputted received signal y from the subtractor 603 is squared in a calculator 604, the squared value is accumulated with a distance value of a $8^{th}$ symbol of a previous cycle in an adder 605, and a distance value of a $7^{th}$ symbol is calculated.

Then, the hard decision unit 606 performs hard decision for a $6^{th}$ symbol of an upper triangular matrix R. Remaining elements of the upper triangular matrix R are subtracted from the updated received signal y which is calculated at a previous cycle through the shifter, the adder, the multiplexer, and the subtractor.

Figure 7:
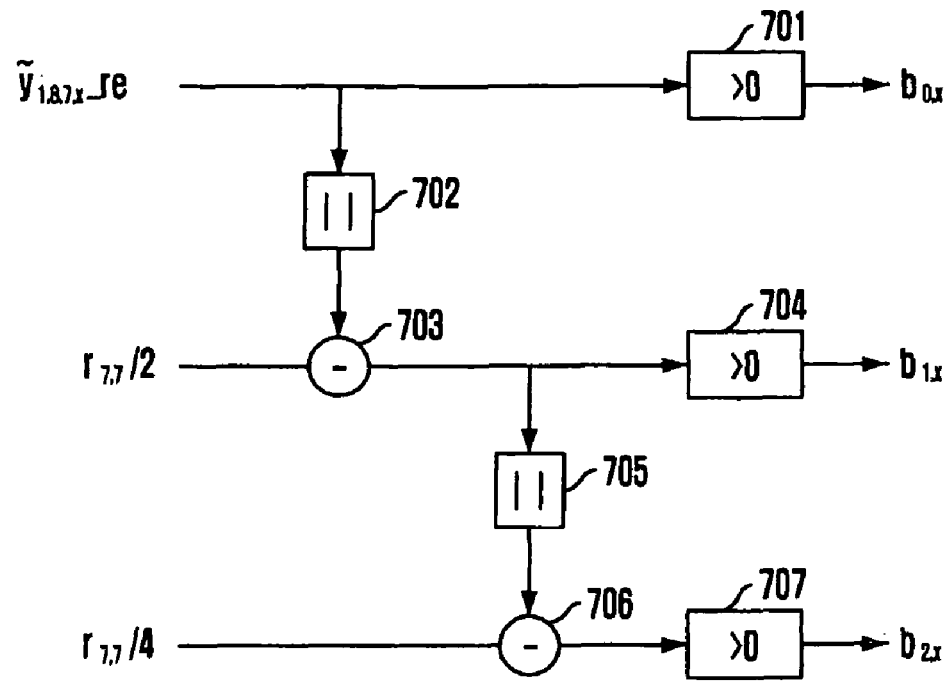
FIG. 7 is a block diagram illustrating a hard decision unit in accordance with an embodiment of the present invention.
Figure 7:
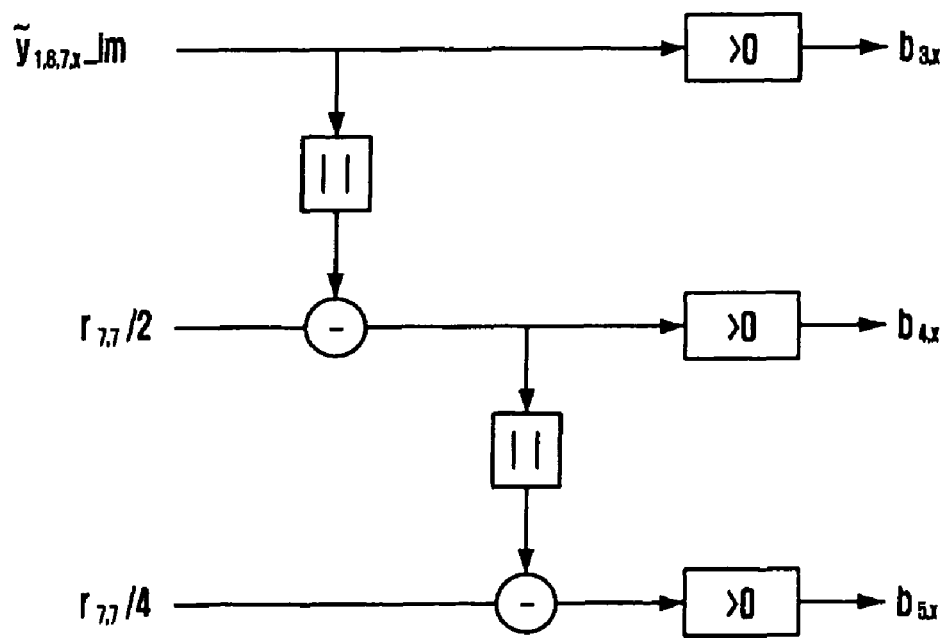

FIG. 7 is a diagram illustrating a hard decision unit in accordance with an embodiment of the present invention.

For example, in $\tilde{s}_{8,7,x}$=hard decision($\tilde{y}_{1,8,7,x}/r_{7,7}$) for hard decision for a $7^{th}$ symbol value in order to decide a $8^{th}$ symbol value in 64 QAM, an updated received signal must be divided by an element $r_{7,7}$ of an upper triangular matrix R. That is, a division operation is required. The division operation increases hardware complexity.

Figure 8A:
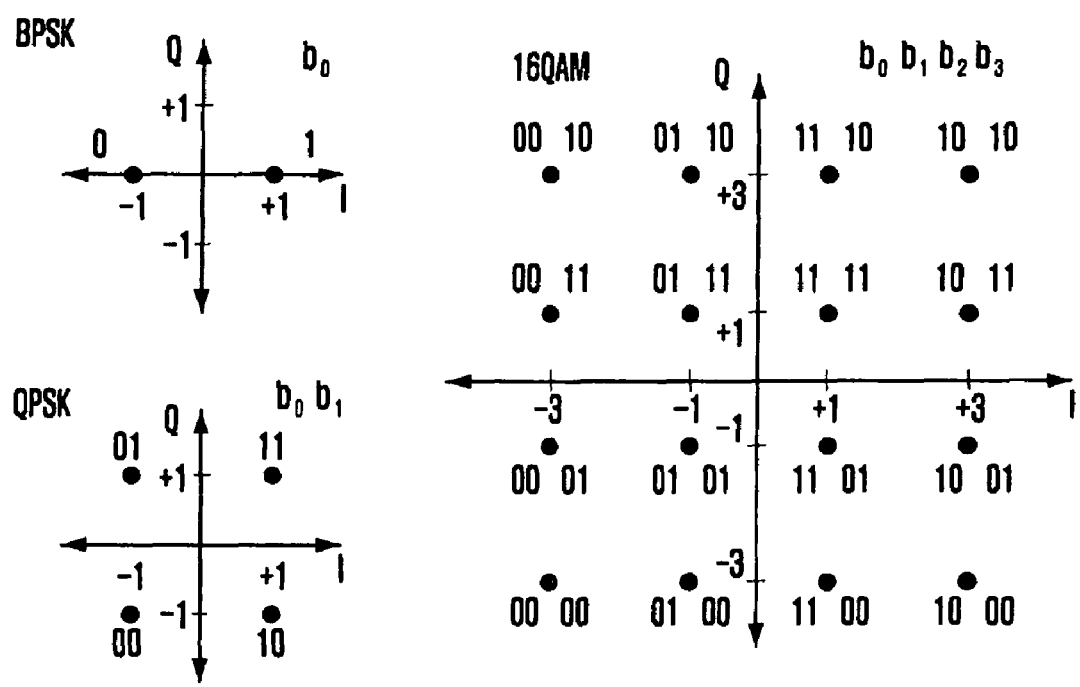
FIGS. 8A and 8B illustrate a symbol structure having a typical lattice point.
Figure 8B:
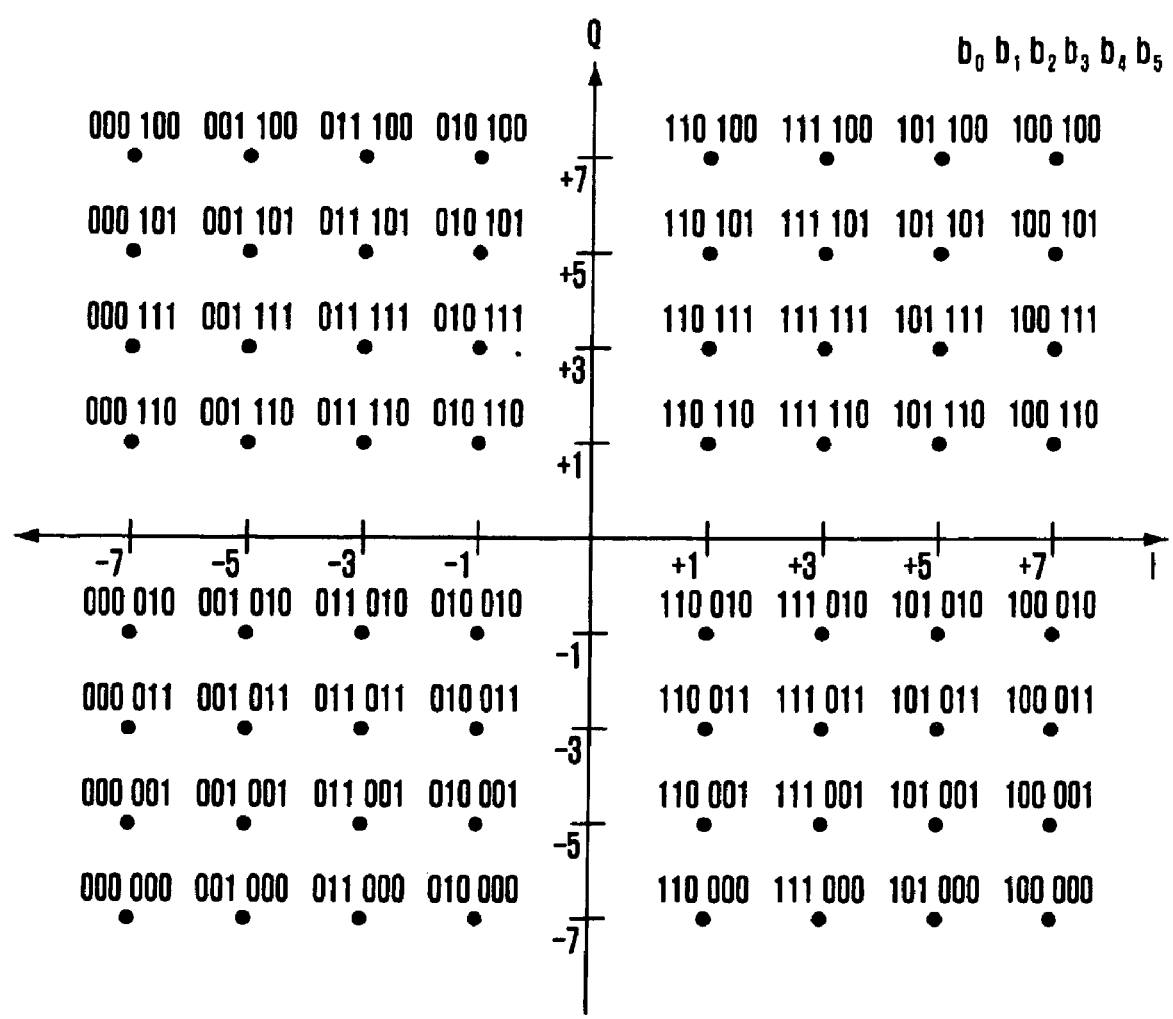

In order to avoid the division operation, a simple comparator is used in the present embodiment instead of using a divider. That is, three bits of $b_0$, $b_1$, and $b_2$ are decided in a real part and $b_3$, $b_4$, and $b_5$ are decided in an imaginary part using the simple comparator. FIGS. 8A and 8B show a symbol structure having lattice points different according to a modulation scheme.

That is, FIG. 8A shows the symbol structure for BPSK, QPSK, and 16 QAM. FIG. 8B shows a symbol structure for 64 QAM. In the present embodiment, a hard-decision symbol is decided for bits $b_0$ $b_1$ $b_2$ $b_3$ $b_4$ $b_5$ $b_6$ by mapping previously decided bits to a symbol structure having lattice points of FIGS. 8A and 8B.

Table 1 shows scaling factors according to a modulation scheme.

TABLE 1

| Modulation scheme | Scaling factor |
|---|---|
| BPSK | 1 |
| QPSK | ½ |
| 16 QAM | ¼ |
| 64 QAM | ⅛ |

Referring to FIG. 7, a bit $b_0$ is decided through a comparator 701 for comparing a real part of an updated received signal, a bit $b_1$ is decided through a comparator 704 for comparing a difference 703 between an absolute value 702 of a real part of an updated received signal and a value of $r_{7,7}/4$. For the imaginary part of the updated received signal, bits $b_3$, $b_3'$, $b_5$ are decided through the same operation as described above.

The multi-dimensional detector for a receiver of an MIMO system and the method thereof according to the present embodiment were described under an assumption that the MIMO receiver includes eight antennas for receiving and transmitting signals. However, it is obvious that the multi-dimensional detector for a receiver of an MIMO system and the method thereof according to the present embodiment can be identically applied although the MIMO receiver includes the different number of antennas because the number of antennas is parameter of a vector Z or an upper triangular matrix R.

The present application contains subject matter related to Korean Patent Application No. 2007-0133323, filed in the Korean Intellectual Property Office on Dec. 18, 2007, the entire contents of which is incorporated herein by reference.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to the specific embodiments, it will be apparent to those skilled in the art that various changes and modifications may be made without departing from the spirit and scope of the invention as defined in the following claims.

What is claimed is:

1. A multi-dimensional detector for a receiver of a multiple input multiple output (MIMO) system, comprising:
   a first symbol detecting means for calculating symbol distance values of a symbol using an upper triangular matrix (R) obtained from QR decomposition, to detect an $m^{th}$ symbol, wherein 'Q' denotes a unitary matrix and 'm' is a positive integer greater than one;
   a symbol deciding means for deciding the $m^{th}$ symbol having a minimum distance value among the calculated symbol distance values from the first symbol detecting means;
   a column removing and updating means for removing an mth column of the upper triangular matrix R from the decided $m^{th}$ symbol, and updating a received signal; and
   a second symbol detecting means for calculating symbol distance values based on the updated received signal y and the column removed upper triangular matrix R, to detect a $(m-1)^{th}$ symbol.

2. The multi-dimensional detector of claim 1, further comprising:
   a first log likelihood ratio calculating means for calculating a first log likelihood ratio using the symbol distance values outputted from the first symbol detecting means; and
   a second log likelihood ratio calculating means for calculating a second log likelihood ratio using the symbol distance values outputted from the second symbol detecting means.

3. The multi-dimensional detector of claim 1, wherein each of the first and second symbol detecting means includes:
- a symbol generating means for generating symbols;
- a plurality of symbol distance calculating means for receiving the upper triangular matrix R and the generated symbols and sequentially performing hard decision for the received symbols and calculating symbol distance values for the received symbols; and
- a buffering means for storing the calculated distance values from the symbol distance calculating means.

4. The multi-dimensional detector of claim 3, further comprising:
- registers for temporally storing each of the updated received signals and providing the temporally stored updated received signals to the symbol distance calculating means for a next iteration of symbol distance calculation.

5. The multi-dimensional detector of claim 4, wherein each of the symbol distance calculating means includes:
- a plurality of shifting and adding means for shifting each of inputted triangular matrices R as much as symbols generated from the symbol generating means and adding the shifted matrices;
- a calculating means for calculating a distance value to detect a symbol using the results of the shifting and adding means, a previous hard decision result, and an updated received signal; and
- a hard decision means for performing hard decision for a newly updated received signal based on the results of the shifting and adding means.

6. The multi-dimensional detector of claim 5, wherein the calculating means subtracts column values of an upper triangular matrix R of the shifting and adding means, which is selected by a previous hard decision result, from the updated received signal, and calculates a distance value for an own symbol by accumulating the subtracting result with a previous symbol distance value.

7. The multi-dimensional detector of claim 5, wherein the hard decision means includes:
- a plurality of calculating means for receiving a real part and an imaginary part of an updated received signal and performing calculation on an upper triangular matrix R vector with the received real part and imaginary part; and
- a comparing means for deciding a plurality of bits by comparing the real part and the imaginary part with a predetermined value and comparing each of the outputs of the calculating means with a predetermined value,
- wherein hard decision is performed by mapping the decided bits to a lattice point structure of a symbol.

8. A multi-dimensional detecting method being performed via a receiver of a multiple input multiple output (MIMO) system, comprising:
- calculating, via a first symbol detector, symbol distance values of a symbol using an upper triangular matrix R obtained from QR decomposition, to detect an $m^{th}$ symbol, wherein 'Q' denotes a unitary matrix and 'm' is a positive integer greater than one;
- deciding, via a symbol decider, the $m^{th}$ symbol having a minimum distance value among the calculated symbol distance values;
- removing, via a column remover, an $m^{th}$ column of the upper triangular matrix R from the decided $m^{th}$ symbol and updating a received signal; and
- calculating, via a second symbol detector, symbol distance values using the updated received signal and the column removed upper triangular matrix R, to detect a $(m-1)^{th}$ symbol.

9. The multi-dimensional detecting method of claim 8, further comprising:
- calculating a first log likelihood ratio using the symbol distance values outputted from said calculating symbol distance values using the upper triangular matrix R; and
- calculating a second log likelihood ratio using the symbol distance values outputted from said calculating symbol distance values using the updated received signal.

10. The multi-dimensional detecting method of claim 8, wherein said calculating symbol distance values using the upper triangular matrix R includes:
- generating symbols;
- sequentially performing hard decision for each symbol and calculating symbol distance values to detect the $m^{th}$ symbol using the upper triangular matrix R and the generated symbols; and
- accumulating the calculated symbol distance values for each symbol and storing the accumulated symbol distance value.

11. The multi-dimensional detecting method of claim 10, wherein said the sequentially performing hard decision includes:
- performing hard decision for a $(m-1)^{th}$ symbol, calculating distance values of an $m^{th}$ symbol, and outputting the updated received signal;
- performing hard decision for a $(m-2)^{th}$ symbol using the updated received signal, calculating distance values of a $(m-1)^{th}$ symbol, and newly updating the updated received signal; and
- performing a process of performing hard decision for a next symbol, calculating distance values of an own symbol using the updated received signal, and updating the updated received signal y until a first symbol.

12. The multi-dimensional detecting method of claim 11, wherein the distance values of the $m^{th}$ symbol are calculated by subtracting a multiplying result of an $m^{th}$ element of the upper triangular matrix R and the $m^{th}$ element of the generated symbol from a multiplying value of a constant C and an $m^{th}$ received signal vector and squaring an absolute value of the subtracting result.

13. The multi-dimensional detecting method of claim 11, wherein distance values of the $(m-1)^{th}$ symbol are calculated by subtracting a multiplying result of a $(m-1)^{th}$ element of the upper triangular matrix R and the $(m-1)^{th}$ element of hard decision element from an updated $(m-1)^{th}$ received signal, squaring an absolute value of the subtracting result, and accumulating the squaring result and the distance values of the $m^{th}$ symbol.

14. The multi-dimensional detecting method of claim 12, wherein the multiplying result of the $m^{th}$ element of the upper triangular matrix R and the $m^{th}$ element of the generated symbol is subtracted after shifting the upper triangular matrix R as much as the generated symbols.

15. A receiver of a multiple input multiple output (MIMO) system, comprising:
- a QR decomposing means for decomposing a received signal to an unitary matrix Q and an upper triangular matrix R; and
- a multi-dimensional detecting means for deciding an $m^{th}$ symbol and a $(m-1)^{th}$ symbol, wherein 'm' is a positive integer greater than one, through multi-dimensional detection for the output of the QR decomposing means, wherein the multi-dimensional detecting means includes:
a first symbol detecting means for calculating symbol distance values of a symbol using the upper triangular matrix (R) obtained from QR decomposition, to detect the $m^{th}$ symbol;
a symbol deciding means for deciding the $m^{th}$ symbol having a minimum distance value among the calculated symbol distance values from the first symbol detecting means;
a column removing and updating means for removing an $m^{th}$ column of the upper triangular matrix R from the decided $m^{th}$ symbol, and updating a received signal; and
a second symbol detecting means for calculating symbol distance values using the updated received signal and the column removed upper triangular matrix R, to detect a $(m-1)^{th}$ symbol.

16. The apparatus of claim 15, wherein the multi-dimensional detecting means further includes:
a first log likelihood ratio calculating means for calculating a first log likelihood ratio using the symbol distance values outputted from the first symbol detecting means; and
a second log likelihood ratio calculating means for calculating a second log likelihood ratio using the symbol distance values outputted from the second symbol detecting means.

* * * * *